United States Patent
Stieglitz et al.

(10) Patent No.: US 12,008,034 B2
(45) Date of Patent: Jun. 11, 2024

(54) DIGITAL IMAGE PRESENTATION

(71) Applicant: eBay Inc., San Jose, CA (US)

(72) Inventors: Susan Stieglitz, Menlo Park, CA (US);
Yem Huynh, San Francisco, CA (US);
Fazeel Mufti, Pleasanton, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/144,159

(22) Filed: May 5, 2023

(65) Prior Publication Data

US 2023/0273953 A1    Aug. 31, 2023

Related U.S. Application Data

(63) Continuation of application No. 17/004,594, filed on Aug. 27, 2020, now Pat. No. 11,681,745, and a
(Continued)

(51) Int. Cl.
*G06T 7/11* (2017.01)
*G06F 16/51* (2019.01)
(Continued)

(52) U.S. Cl.
CPC .......... *G06F 16/5866* (2019.01); *G06F 16/51* (2019.01); *G06F 16/958* (2019.01);
(Continued)

(58) Field of Classification Search
CPC .... G06F 16/5866; G06F 16/51; G06F 16/958; G06F 16/5854; G06T 1/60; G06T 3/40;
(Continued)

(56) References Cited

U.S. PATENT DOCUMENTS

| | | |
|---|---|---|
| 5,634,064 A | 5/1997 | Warnock et al. |
| 6,262,769 B1 | 7/2001 | Anderson et al. |
| | (Continued) | |

FOREIGN PATENT DOCUMENTS

| | | |
|---|---|---|
| CN | 101360198 A | 2/2009 |
| CN | 202694370 | 1/2013 |
| | (Continued) | |

OTHER PUBLICATIONS 10-2018-7023320, , "Office Action Received for Korean Patent Application No. 10-2018-7023320, mailed on Jan. 15, 2020", Jan. 15, 2020, 8 Pages.
(Continued)

*Primary Examiner* — Aaron W Carter
(74) *Attorney, Agent, or Firm* — FIG. 1 Patents

(57) ABSTRACT

A computer implemented method to present digital images may include storing a digital image in a database and applying a digital image processing technique to the digital image to identify a region of interest of the digital image. The method may also include storing region data that identifies the region of interest of the digital image in the database and receiving a request for information associated with the digital image from a digital device. In response to the request, the method may include providing the digital image and the region data for transmission to the digital device, the digital device configured to adjust a cropping view of the digital image based on the region data to display the region of interest of the digital image.

20 Claims, 7 Drawing Sheets

Related U.S. Application Data continuation of application No. 15/863,479, filed on Jan. 5, 2018, now Pat. No. 10,796,193, which is a continuation of application No. 15/043,716, filed on Feb. 15, 2016, now Pat. No. 9,864,925.

(51) Int. Cl.
| | |
|---|---|
| *G06F 16/58* | (2019.01) |
| *G06F 16/958* | (2019.01) |
| *G06T 1/60* | (2006.01) |
| *G06T 3/40* | (2006.01) |
| *G06V 20/70* | (2022.01) |
| *G06V 20/10* | (2022.01) |

(52) U.S. Cl.
CPC .................. *G06T 1/60* (2013.01); *G06T 3/40* (2013.01); *G06T 7/11* (2017.01); *G06V 20/70* (2022.01); *G06T 2207/20112* (2013.01); *G06T 2210/22* (2013.01); *G06V 20/10* (2022.01)

(58) Field of Classification Search
CPC ............. G06T 7/11; G06T 2207/20112; G06T 2210/22; G06T 3/4092; G06V 20/70; G06V 20/10; G06V 10/462; G06V 10/25
See application file for complete search history.

(56) References Cited

U.S. PATENT DOCUMENTS

| | | | |
|---|---|---|---|
| 7,065,250 | B1 | 6/2006 | Lennon |
| 8,243,988 | B1 | 8/2012 | Buddemeier |
| 8,532,435 | B1 | 9/2013 | Hegde et al. |
| 8,539,342 | B1 | 9/2013 | Lewis |
| 8,593,555 | B1 | 11/2013 | Chun et al. |
| 9,100,588 | B1 | 8/2015 | Seymour |
| 9,864,925 | B2 | 1/2018 | Stieglitz et al. |
| 10,042,078 | B2 | 8/2018 | Sarraiocco |
| 10,140,515 | B1 | 11/2018 | Waldo |
| 10,796,193 | B2 | 10/2020 | Stieglitz et al. |
| 11,681,745 | B2 | 6/2023 | Stieglitz et al. |
| 2003/0025812 | A1 | 2/2003 | Slatter |
| 2003/0152291 | A1 | 8/2003 | Cheatle |
| 2004/0165784 | A1 | 8/2004 | Xie et al. |
| 2005/0143124 | A1 | 6/2005 | Kennedy et al. |
| 2005/0151884 | A1 | 7/2005 | Oh |
| 2006/0012716 | A1 | 1/2006 | Choi |
| 2006/0050090 | A1 | 3/2006 | Ahmed et al. |
| 2006/0139371 | A1 | 6/2006 | Lavine et al. |
| 2007/0073777 | A1 | 3/2007 | Werwath |
| 2007/0083826 | A1 | 4/2007 | Pessetto et al. |
| 2007/0086660 | A1 | 4/2007 | Ai et al. |
| 2007/0208704 | A1 | 9/2007 | Ives |
| 2008/0181512 | A1 | 7/2008 | Gavin et al. |
| 2008/0235585 | A1 | 9/2008 | Hart et al. |
| 2009/0189920 | A1 | 7/2009 | Chiu et al. |
| 2010/0106506 | A1 | 4/2010 | Carter et al. |
| 2010/0149378 | A1 | 6/2010 | Suzuki |
| 2010/0171764 | A1 | 7/2010 | Feng et al. |
| 2010/0173678 | A1 | 7/2010 | Kim et al. |
| 2010/0302176 | A1 | 12/2010 | Nikula et al. |
| 2011/0052063 | A1 | 3/2011 | Mcauley et al. |
| 2011/0103663 | A1 | 5/2011 | Rosenbaum et al. |
| 2011/0128288 | A1* | 6/2011 | Petrou .................. G06V 10/235 |
| | | | 345/428 |
| 2011/0316768 | A1 | 12/2011 | Mcrae |
| 2012/0002082 | A1 | 1/2012 | Johnson et al. |
| 2012/0062732 | A1 | 3/2012 | Marman et al. |
| 2012/0069050 | A1 | 3/2012 | Park et al. |
| 2012/0110438 | A1 | 5/2012 | Peraza et al. |
| 2012/0311487 | A1 | 12/2012 | Staikos et al. |
| 2013/0016122 | A1 | 1/2013 | Bhatt et al. |
| 2013/0016128 | A1 | 1/2013 | Bhatt |
| 2013/0016255 | A1 | 1/2013 | Bhatt |
| 2013/0176222 | A1 | 7/2013 | Tanaka |
| 2013/0198641 | A1 | 8/2013 | Brownlow et al. |
| 2014/0006982 | A1 | 1/2014 | Wabyick et al. |
| 2014/0118405 | A1 | 5/2014 | Chand et al. |
| 2014/0132637 | A1 | 5/2014 | Yang et al. |
| 2014/0140609 | A1 | 5/2014 | Krishnaswamy et al. |
| 2014/0152702 | A1 | 6/2014 | Takeda |
| 2014/0160293 | A1 | 6/2014 | Ristivojevic et al. |
| 2014/0245115 | A1 | 8/2014 | Zhang et al. |
| 2014/0267430 | A1 | 9/2014 | Kudo et al. |
| 2014/0267770 | A1 | 9/2014 | Gervautz et al. |
| 2014/0270533 | A1 | 9/2014 | Chedeau |
| 2014/0270536 | A1* | 9/2014 | Amtrup .................. G06V 30/40 |
| | | | 382/195 |
| 2014/0340428 | A1 | 11/2014 | Shibayama |
| 2015/0036935 | A1 | 2/2015 | Iio et al. |
| 2015/0054853 | A1 | 2/2015 | Georgiev |
| 2015/0103092 | A1 | 4/2015 | Khambanonda et al. |
| 2015/0142884 | A1 | 5/2015 | Veramendi |
| 2015/0161466 | A1 | 6/2015 | Welinder et al. |
| 2015/0169148 | A1 | 6/2015 | Blumenfeld |
| 2015/0170000 | A1 | 6/2015 | Yang et al. |
| 2015/0254855 | A1 | 9/2015 | Patankar et al. |
| 2015/0262331 | A1 | 9/2015 | Bang et al. |
| 2016/0021316 | A1 | 1/2016 | Tsubusaki |
| 2016/0048636 | A1 | 2/2016 | Warner |
| 2016/0170617 | A1 | 6/2016 | Shi et al. |
| 2016/0283483 | A1 | 9/2016 | Jiang et al. |
| 2016/0295125 | A1 | 10/2016 | Osawa |
| 2017/0004804 | A1 | 1/2017 | Gao et al. |
| 2017/0041529 | A1 | 2/2017 | Park et al. |
| 2017/0061257 | A1 | 3/2017 | Yang et al. |
| 2017/0062012 | A1 | 3/2017 | Bloch et al. |
| 2017/0085932 | A1 | 3/2017 | Berenger |
| 2017/0109615 | A1 | 4/2017 | Yatziv et al. |
| 2017/0236028 | A1 | 8/2017 | Stieglitz et al. |
| 2017/0249719 | A1 | 8/2017 | Kansara |
| 2017/0337903 | A1 | 11/2017 | Van et al. |
| 2018/0007286 | A1 | 1/2018 | Li et al. |
| 2018/0129903 | A1 | 5/2018 | Stieglitz et al. |
| 2019/0266768 | A1* | 8/2019 | Sahagun .................. G06T 11/60 |
| 2020/0401840 | A1 | 12/2020 | Stieglitz et al. |
| 2021/0012502 | A1* | 1/2021 | Mulford .............. G06F 3/04845 |
| 2022/0050867 | A1 | 2/2022 | Waller |
| 2023/0273953 | A1* | 8/2023 | Stieglitz .................... G06T 3/40 |
| | | | 382/195 |
| 2024/0029294 | A1* | 1/2024 | Leroux ..................... G06T 3/40 |

FOREIGN PATENT DOCUMENTS

| | | |
|---|---|---|
| CN | 104105006 | 10/2014 |
| CN | 105095905 | 11/2015 |
| CN | 105283884 A | 1/2016 |
| KR | 20140103043 A | 8/2014 |
| KR | 1020150132212 | 11/2015 |
| WO | WO-2015077259 | 5/2015 |
| WO | WO-2017142717 | 8/2017 |

OTHER PUBLICATIONS 10-2018-7023320, , "Office Action Received for Korean Patent Application No. 10-2018-7023320, mailed on Jul. 21, 2020", Jul. 21, 2020, 4 Pages.
10-2018-7023320, , "Voluntary Amendment filed on Aug. 13, 2018, for Korean Patent Application No. 10-2018-7023320,", 20 Pages.
10-2021-7008501, , "Office Action Received for Korean Patent Application No. 10-2021-7008501, mailed on Jun. 9, 2021", Jun. 9, 2021, 8 Pages.
U.S. Appl. No. 15/043,716, , "First Action Interview—Preinterview Communication received for U.S. Appl. No. 15/043,716, mailed on Jul. 7, 2017", Jul. 7, 2017, 7 Pages.
U.S. Appl. No. 15/043,716, , "Notice of Allowance received for U.S. Appl. No. 15/043,716, mailed on Sep. 5, 2017", Sep. 5, 2017, 19 Pages.
U.S. Appl. No. 15/863,479, , "Applicant Initiated Interview Summary Received for U.S. Appl. No. 15/863,479, mailed on Jan. 21, 2020", Jan. 21, 2020, 3 Pages.

(56) References Cited

OTHER PUBLICATIONS

U.S. Appl. No. 15/863,479, , "Corrected Notice of Allowability received for U.S. Appl. No. 15/863,479, mailed on Aug. 14, 2020", Aug. 14, 2020, 2 Pages.
U.S. Appl. No. 15/863,479, , "Final Office Action Received for U.S. Appl. No. 15/863,479, mailed on Dec. 18, 2019", Dec. 18, 2019, 17 Pages.
U.S. Appl. No. 15/863,479, , "Non-Final Office Action Received for U.S. Appl. No. 15/863,479, mailed on Aug. 20, 2019", Aug. 20, 2019, 14 Pages.
U.S. Appl. No. 15/863,479, , "Notice of Allowance received for U.S. Appl. No. 15/863,479, mailed on Feb. 13, 2020", Feb. 13, 2020, 8 Pages.
U.S. Appl. No. 15/863,479, , "Notice of Allowance received for U.S. Appl. No. 15/863,479, mailed on May 27, 2020", May 27, 2020, 7 Pages.
17753636.4, , "Communication Pursuant to Article 94(3) EPC Received for European Patent Application No. 17753636.4, mailed on May 12, 2020", May 12, 2020, 9 Pages.
17753636.4, , "Extended European Search Report Received for European Patent Application No. 17753636.4, mailed on Jun. 3, 2019", Jun. 3, 2019, 8 Pages.
17753636.4, , "Summons to Attend Oral Proceedings Received for European Patent Application No. 17753636.4, mailed on Sep. 24, 2020", Sep. 24, 2020, 13 Pages.
201780011592.9, , "Office Action Received for Chinese Patent Application No. 201780011592.9, mailed on Oct. 29, 2020", Oct. 29, 2020, 10 Pages.
Henry, , "Metric Free Nearness Measure using Description-based Neighbourhoods", Dec. 31, 2013, 28 Pages.
Hu, et al., "Region-of-interest based image resolution adaptation for MPEG-21 digital item", Oct. 16, 2004, 4 Pages.
PCT/US2017/016483, , "International Preliminary Report on Patentability received for PCT Patent Application No. PCT/US2017/016483, mailed on Aug. 30, 2018", Aug. 30, 2018, 7 Pages.
PCT/US2017/016483, , "International Search Report received for PCT Application No. PCT/US2017/016483, mailed on Apr. 13, 2017", Apr. 13, 2017, 2 Pages.
PCT/US2017/016483, , "Written Opinion received for PCT Application No. PCT/US2017/016483, mailed on Apr. 13, 2017", Apr. 13, 2017, 5 Pages.
202110490703.7 , "Foreign Office Action", CN Application No. 202110490703.7, Sep. 29, 2023, 8 pages.
202110490703.7 , "Office Action", CN Application No. 202110490703.7, Jun. 27, 2023, 8 pages.

\* cited by examiner

DIGITAL IMAGE PRESENTATION

CROSS-REFERENCE TO RELATED APPLICATIONS

This application is a continuation of U.S. patent application Ser. No. 17/004,594, filed on Aug. 27, 2020; which is a continuation of U.S. patent application Ser. No. 15/863,479, filed on Jan. 5, 2018, now U.S. Pat. No. 10,796,193, issued on Oct. 6, 2020; which is a continuation of U.S. patent application Ser. No. 15/043,716, filed on Feb. 15, 2016, now U.S. Pat. No. 9,864,925, issued Jan. 9, 2018; the disclosures of all of these applications and patents are incorporated by reference herein.

FIELD

The embodiments discussed herein are related to the presentation of digital images.

BACKGROUND

With the increase of use of digital cameras and the ease of sharing digital images, digital images are commonly presented on webpages and other electronic devices. Additionally, with mobile electronic device use becoming more prevalent, digital images are being presented by many different types of electronic devices of varying shapes and sizes.

The subject matter claimed herein is not limited to embodiments that solve any disadvantages or that operate only in environments such as those described above. Rather, this background is only provided to illustrate one example technology area where some embodiments described herein may be practiced.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described in this disclosure may relate to how digital images are presented on electronic devices. For example, a web browser may be configured to present a webpage that includes a digital image on a display of an electronic device. The web browser may receive the webpage and the digital images from a server. In some circumstances, the digital images may not be the same every time that the webpage is presented. For example, the server may select from multiple different images for presenting on the webpage based on the requesting electronic device and other information. Furthermore, the digital images that may be presented on the webpage may have multiple different sizes and configurations. For example, some of the images may be horizontal images and other of the digital images may be vertical images. Additionally, the webpage may not present the entirety of the digital image. Rather, the webpage may include instructions for the web browser to only present a portion of the digital image in a designated section of the webpage. In some circumstances, the portion of the digital image selected for presentation may not be a region of interest of the digital image. For example, the portion of the image selected for presentation may include a portion of the region of interest of the digital image, such as half of a face of a person or half of the people in the digital image.

In some embodiments described in this disclosure, a system may be configured to provide an application configured to display a digital image, such as a web browser or other application, with data about the region of interest of the digital image. Using the data about the region of interest of the digital image, the application may more often select a region of interest of the digital image for display.

In some embodiments described in this disclosure, the region of interest of a digital image may be determined and stored as region data with the digital image. The region of interest may be determined using image processing that does not affect or change the digital image. In response to a request from a digital device for information associated with the digital image, such as a request for a webpage that may include the digital image, the digital image and the region data may transmitted to the digital device. The digital device may adjust a cropping view of the digital image based on the region data to display the region of interest of the digital image in the webpage without changing the digital image.

Figure 1:
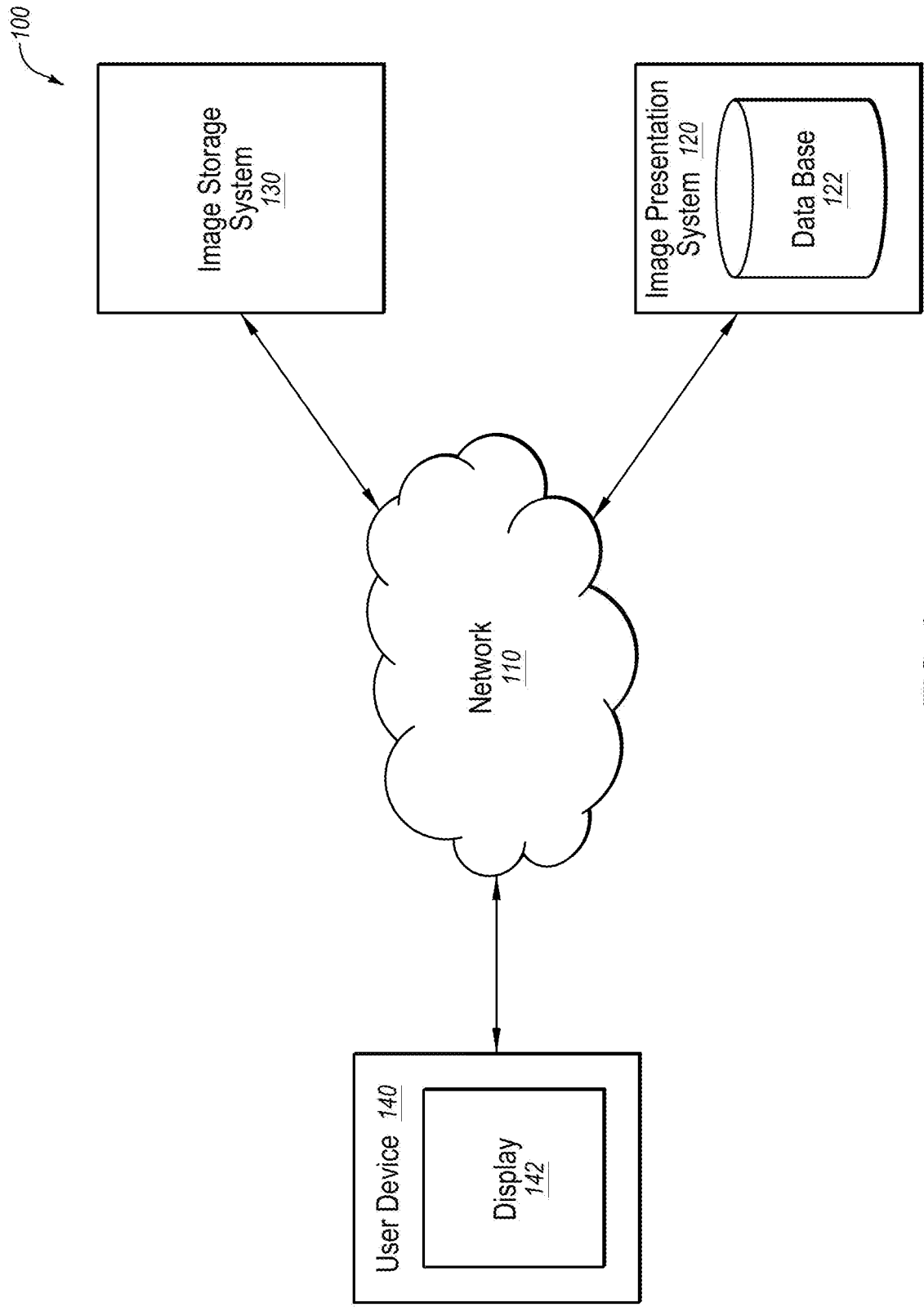
FIG. 1 is an example system for digital image presentation.

Turning to the figures, FIG. 1 illustrates an example system 100 for digital image presentation. The system 100 may be arranged in accordance with at least one embodiment described in the present disclosure. The system 100 may include a network 110, an image presentation system 120, an image storage system 130, and a user device 140 that includes a display 142.

The network 110 may be configured to communicatively couple the image presentation system 120, the image storage system 130, and the user device 140. In some embodiments, the network 110 may be any network or configuration of networks configured to send and receive communications between devices. In some embodiments, the network 110 may include a conventional type network, a wired or wireless network, and may have numerous different configurations. Furthermore, the network 110 may include a local area network (LAN), a wide area network (WAN) (e.g., the Internet), or other interconnected data paths across which multiple devices and/or entities may communicate. In some embodiments, the network 110 may include a peer-to-peer network. The network 110 may also be coupled to or may include portions of a telecommunications network for sending data in a variety of different communication protocols. In some embodiments, the network 110 may include Bluetooth® communication networks or cellular communication networks for sending and receiving communications and/or data including via short message service (SMS), multimedia messaging service (MMS), hypertext transfer protocol (HTTP), direct data connection, wireless application protocol (WAP), e-mail, etc. The network 110 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks. Further, the network 110 may include one or more IEEE 802.11 wireless networks.

In some embodiments, the image presentation system 120 and the image storage system 130 may include any configuration of hardware, such as processors, servers, and databases that are networked together and configured to perform a task. For example, the image presentation system 120 and the image storage system 130 may include multiple computing systems, such as multiple servers that each include memory and a processor, which are networked together and configured to perform operations as described in this disclosure. In some embodiments, the image presentation system 120 may include computer-readable-instructions that are configured to be executed by the image presentation system 120 and/or one or more devices in the system 100, such as the user device 140, to perform operations described in this disclosure.

The image presentation system 120 may include a database 122. In general, the image presentation system 120 may be configured to obtain and store digital images in the database 122. While the digital images are stored in the database 122, the image presentation system 120 may be configured to perform image processing on the digital images to determine a region of interest of the digital images. The image processing may be performed without changing the digital images. Region data that describes the region of interest of each of the digital images may be associated with the digital images in the database 122.

In some embodiments, the image presentation system 120 may be further configured to provide one or more of the digital images from the database 122 to requesting devices along with region data corresponding to the one or more digital images. The requesting device may use the region data to determine a portion of the digital images to present on a display.

Digital images, as described in this disclosure, may include a numeric representation of a two-dimensional image based on a set of pixels arranged in rows and columns. The digital images may be stored in any one of a number of formats, such as Joint Photographic Experts Group (JPEG), Exchangeable image file format (Exif), Tagged Image file format (TIFF), Graphics Interchange Format (GIF), among others. The digital images as described may be compressed or uncompressed. As described in this disclosure, the compression and decompression may not change the digital image. A digital image may be changed when a size or resolution, such as a number of rows or columns of pixels are removed or added, an orientation is changed, or individual or groups of pixels values are adjusted to enhance or change the pixels to adjust an attribute of the digital image, such as a brightness, contrast, or color, among other attributes of digital images.

In some embodiments, the image presentation system 120 may be configured to communicate with the image storage system 130. The image storage system 130 may be a system that hosts digital images. The image presentation system 120 may be configured to request digital images from the image storage system 130. The image storage system 130 may provide digital images to the image presentation system 120. The digital images received from the image storage system 130 may include a description of objects depicted in the digital image. For example, a digital image of a person may include a description with the name of the person. The digital images received from the image presentation system 120 may not be uniform. Thus, the digital images may have different orientations, resolutions, or sizes, among other differences.

The image presentation system 120 may be configured to store the digital images from the image storage system 130 in the database 122 based on the description of the images from the image storage system 130. In some embodiments, the database 122 may include a hierarchical tree database with multiple branches and multiple levels in each branch. Based on the description of the digital images, the digital images may be stored in different branches and different levels of each branch in the hierarchical tree in the database 122.

In some embodiments, the image presentation system 120 may not change or alter the digital images received from the image storage system 130. In these and other embodiments, the image presentation system 120 may receive and store the digital images while maintaining the digital images unchanged. In some embodiments, maintaining the digital images unchanged may include not changing the size, such as by adjusting the number of rows or columns of pixels, not changing the resolution, orientation, or adjusting individual or groups of pixels' values to enhance or change the pixels to adjust an attribute of the digital image, such as a brightness, contrast, or color, among other attributes.

In some embodiments, each hierarchical level within the database 122 may be associated with a digital image processing technique. In some embodiments, each hierarchical level may be associated with a different digital image processing technique. Thus, if there are three hierarchical levels, there may be three different digital image processing techniques. The digital image processing techniques may include facial recognition, detection of skin tones, or detection of background that include sky, water, or other backgrounds of uniform or mostly uniform colors, texture, etc., among other digital image processing techniques. The digital image processing techniques applied to digital images in a hierarchical level may be a combination of processing techniques. In some embodiments, the different digital image processing techniques may be different based on how the same processing techniques are applied to the digital images or an order of application of the processing techniques.

In some embodiments, the digital image processing techniques applied to the digital images may identify a region of interest of the digital images. In these and other embodiments, the digital image processing techniques may not change the digital images. Rather, the digital image processing techniques may use information from the digital images, such as values of individual pixels, to algorithms to determine objects and the region of interest in the digital images. In this manner, the values of pixels and/or a number of pixels of the digital images may remain unchanged.

The region of interest of a digital image may be a region of the digital image that includes a focus of the digital image. For example, a region of interest of the digital image may be a region that depicts an object that allows for labeling of the digital image by the image storage system 130. For example, a digital image may include a person, a stage, and a podium. The digital image may be categorized as an image of the person by the image storage system 130. Thus, the region of interest may be the person. In these and other embodiments, the image presentation system 120 may determine a region of the digital image that includes the person. The region of the digital image may be defined based on pixel columns and pixel rows of the digital image that include the object of interest. For example, a 512 row by 1024 column image may have a region of interest that extends from row 150 to 250 and from column 250 to 600.

In some embodiments, the region of interest location may be saved in region data. In some embodiments, the region data may include the columns and rows of interest. Alternately or additionally, the region data may include multiple corners of the region, or one corner and dimensions of the region of interest. In some embodiments, the region data describing the region of interest may be based on the shape of the region of interest. For example, the region of interest may be square, rectangular, oval, circular, trapezoidal, hexagonal, pentagonal, octagonal, or some other shape. In these and other embodiments, the shape of the region of interest may determine a configuration of the region data.

In some embodiments, the larger region of interest may be based on multiple smaller regions of interest that may be grouped together to form the larger region of interest. For example, a digital image may include multiple people. Each face of each person may be a smaller region of interest. The smaller regions of interest may be grouped such that a larger region of interest includes each of the smaller regions of interest. As a result, the larger region of interest may define a region in the digital image that includes the faces of each of the people in the digital image.

The region data may be associated with the digital image and saved in the database 122. In some embodiments, the database 122 may include other attribute data about the digital image. For example, the attribute data may include an orientation, width, height, contrast, brightness, or color, among other attributes of digital images. In these and other embodiments, the attribute data may be provided by the image storage system 130 or may be determined by the image presentation system 120. In these and other embodiments, the attribute data and the region data may both be saved in the database 122 and associated with the digital images. In some embodiments, the attribute data and the region data of a digital image may be referred to as metadata of the digital image.

The image presentation system 120 may be configured to provide the digital images saved in the database 122 to other digital devices for presentation of the digital images. For example, the image presentation system 120 may be configured to provide digital images to the user device 140 for display on the display 142.

The user device 140 may be any electronic or digital device configured to provide a user with access to one or more systems, which may include one or more servers and databases, through a network, such as the network 110. For example, the user device 140 may include a desktop computer, a laptop computer, a smartphone, a mobile phone, a tablet computer, or any other processing device configured to access and display information.

The user device 140 may request information from the image presentation system 120. The image presentation system 120 may be configured to provide the information and digital images associated with the requested information for transmission to the user device 140 over the network 110. Along with the digital images, the image presentation system 120 may provide metadata associated with the digital images for transmission to the user device 140.

The user device 140 may receive the information, the digital images, and the metadata. The user device 140 may be configured to display the information and the digital images. In some embodiments, the user device 140 may determine how to display the information and the digital images based on the operational information about the user device 140. For example, the operational information about the user device 140 may include information about the orientation of the user device 140, a display size of the user device 140, a display area within the display of the user device 140, and a resolution of the user device 140, among other information about the user device 140.

For example, the user device 140 may determine a first configuration for displaying the information and the digital images based on the user device 140 having a vertical orientation and second configuration for displaying the information and the digital images based on the user device 140 having a horizontal orientation. Alternately or additionally, the user device 140 may determine a third configuration for displaying the information and the digital images based on the user device 140 having a first display area within the display 142 and second configuration for displaying the information and the digital images based on the user device 140 having a second display area within the display 142. As an example, the display area may be a window within the display 142. The window size may be adjusted within the display 142 to encompass the entire display 142 or a portion of the display 142. In these and other embodiments, the user device 140 may be configured to determine how to present the information and the digital images based on the window size.

For each configuration for displaying the information and the digital images, the user device 140 may determine a different display area for one or more of the digital images. The display areas for the digital images may be smaller than the digital images. Thus, the entire digital image may not be displayed in the display area. In these and other embodiments, the user device 140 may determine a portion of the digital image to display that corresponds with the display area. The portion of the digital image to display may be referred to as a cropping view of the digital image. The user device 140 may select the cropping view of the digital image based on the metadata of the digital image. In particular, the user device 140 may select the cropping view such that at least a portion of the region of interest of the digital image is included in the cropping view of the digital image. By selecting a cropping view, the user device 140 displays a portion of the digital image without changing the digital image.

For example, in some embodiments, the user device 140 may include an application provided by a system associated with the image presentation system 120. For example, the user device 140 may be a mobile phone with a specific application configured to communicate and receive data from the image presentation system 120. The specific application may request information from the image presentation system 120. The image presentation system 120 may provide the information and one or more digital images associated with the information, along with metadata of the digital image, to the user device 140.

The specific application may obtain operating data of the user device 140. The operating data may include a screen size and orientation of the user device 140. Based on the screen size and orientation of the user device 140, the specific application may determine how to present the information and digital images on the display 142, including a display size for each of the digital images. Based on the display size and the region of interest for each of the digital images, the specific application may select the cropping view for each of the digital images such that at least a portion of the region of interest for each digital image is displayed on the display 142.

As another example, in some embodiments, the image presentation system 120 may include a web server that hosts webpages of a website that are accessed through uniform resource locators (URLs). In these and other embodiments, the image presentation system 120 may include code, such as hypertext markup language (HTML) and JavaScript code that may be provided to devices based on received requests. The user device 140 may send a request with a URL of a webpage. The image presentation system 120 may respond to the request by sending code, information, and digital images for presenting the webpage to the user device 140.

The user device 140 may receive the code, the information, and the digital images. Based on the code, the information, and the digital images, the user device 140, through an application such as a web browser, may present the webpage to the user through the display 142.

In some embodiments, the code provided by the image presentation system 120 may include client-side code that may be executed by the user device 140. For example, the client-side code may be JavaScript and/or HTML. The user device 140 may execute the client-side code to render the webpage in the browser with information and digital images. For example, based on the code, the user device 140 may perform operations to determine operating data of the user device 140. The operating data may include a screen size and orientation of the user device 140. Based on the screen size and orientation of the user device 140, the user device 140 may perform operations to determine how to present the webpage, with the information and the digital images, on the display 142, including a display size for each of the digital images. Based on the display size and the region of interest for each of the digital images, a cropping view for each of the digital images may be selected such that at least a portion of the region of interest for each digital image is displayed on the display 142.

By determining a region of interest of digital images and aligning a cropping view on a user device with the region of interests, digital images may be displayed in a manner such that the object of interest of the digital image may be displayed. Furthermore, by determining a region of interest and allowing a user device to select a cropping view, the image presentation system 120 may provide the same images to multiple different user devices, each with potentially multiple different configurations, and achieve a more consistent presentation among the user devices. Alternately or additionally, by determining a region of interest of digital images, the digital images from the image storage system 130 with their different configurations may be maintained and not normalized while still achieving a more consistent presentation of the images at user devices.

Modifications, additions, or omissions may be made to the system 100 without departing from the scope of the present disclosure. For example, in some embodiments, the system 100 may include multiple image storage systems 130 from which the digital images may be obtained by the image presentation system 120. Alternately or additionally, the system 100 may include multiple user devices 140 that request information from the image presentation system 120.

Figure 2:
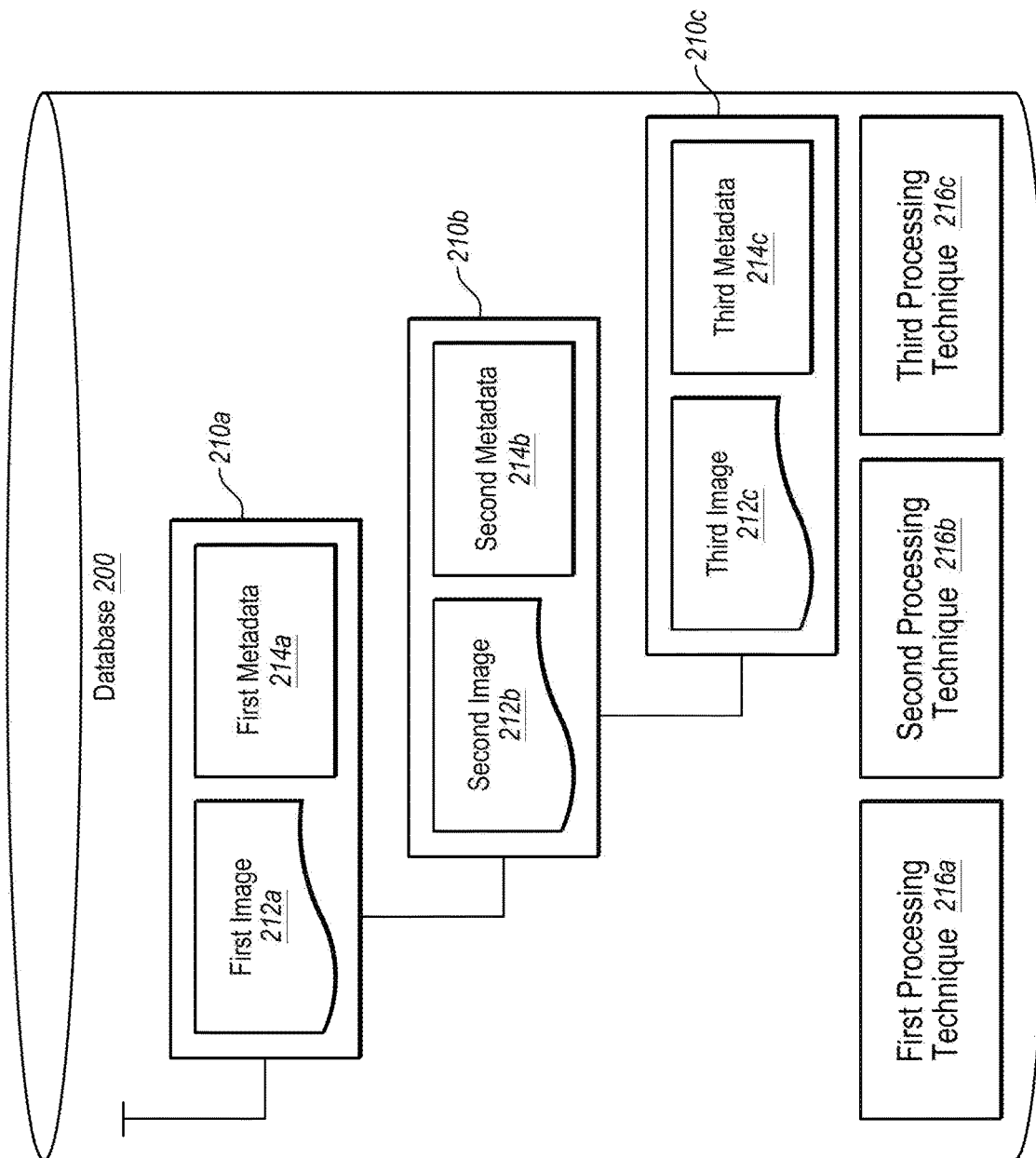
FIG. 2 is an example of hierarchical levels in a database.

FIG. 2 is an example of hierarchical levels within a database 200. The database 200 may be arranged in accordance with at least one embodiment described in the present disclosure. The database 200 may include a branch that may include a first hierarchical level 210a, a second hierarchical level 210b, and a third hierarchical level 210c, which may be referred to as the hierarchical levels 210.

The first hierarchical level 210a may include a first image 212a and first metadata 214a corresponding to the first image 212a. The second hierarchical level 210b may include a second image 212b and second metadata 214b corresponding to the second image 212b. The third hierarchical level 210c may include a third image 212c and third metadata 214c corresponding to the third image 212c. The first image 212a, the second image 212b, and the third image 212c may be referred to as the images 212. The first metadata 214a, the second metadata 214b, and the third metadata 214c may be referred to as the metadata 214.

In some embodiments, the images 212 may be placed in the hierarchical levels 210 based on a description of the images 212 received from another system. After the images 212 are in the hierarchical levels 210, the images 212 may be processed to generate the metadata 214. In some embodiments, the images 212 in each hierarchical level 210 may be processed using a unique processing technique.

For example, in some embodiments, the first image 212a in the first hierarchical level 210a may be processed using the first processing technique 216a to generate the first metadata 214a. The first metadata 214a may include region data that describes a region of interest in the first image 212a as identified by applying the first processing technique 216a to the first image 212a.

In some embodiments, the second image 212b in the second hierarchical level 210b may be processed using the second processing technique 216b to generate the second metadata 214b. The second metadata 214b may include region data that describes a region of interest in the second image 212b as identified by applying the second processing technique 216b to the second image 212b.

In some embodiments, the third image 212c in the third hierarchical level 210c may be processed using the third processing technique 216c to generate the third metadata 214c. The third metadata 214c may include region data that describes a region of interest in the third image 212c as identified by applying the third processing technique 216c to the third image 212c.

In these and other embodiments, the first processing technique 216a, the second processing technique 216b, and the third processing technique 216c may be different processing techniques. In some embodiments, the differences may include the processing techniques 216 including different algorithms, or a different order of applying the same algorithms, among other differences.

In some embodiments, a processing technique 216 for a given hierarchical level 210 may be based on the types of images stored in the hierarchical level 210. For example, the hierarchical levels 210 may relate to rock music. The first hierarchical level 210a may include digital images generally related to rock music, such as a music venue. In these and other embodiments, the first processing technique 216a may include algorithms related to determine a region of interest for a music venue, such as a stage. The second hierarchical level 210b may include digital images generally related to 1980's rock bands, such as generic rock band pictures. In these and other embodiments, the second processing technique 216b may include algorithms related to determine a region of interest for generic rock band pictures, such as multiple people. The third hierarchical level 210c may include digital images of people in a specific rock band. In these and other embodiments, the third processing technique 216c may include algorithms related to determining a region of interest that includes faces in a picture, such as facial recognition techniques.

In some embodiments, the images 212 and the metadata 214 may be provided to a user device based on a request from a user device to a system that includes the database 200. For example, the user device may request a webpage or information for presenting to a user of the device. The system may determine information to respond to the request. The system may also select images for including in the response that may be associated with the information. For example, the user device may request a webpage of an online ticket marketplace. The online ticket marketplace may determine events that are occurring in an area near to the physical location of the user device. The webpage of the online ticket marketplace may include information about the events occurring in the area as well as images about the events. Thus, the images may be associated with the information. In these and other embodiments, the images being associated with information may indicate that the images include an object that is associated with, corresponds to, and/or is related to the information. For example, information about a basketball game for a professional team may include images of the professional team, images of a basketball or other basketball equipment, an image of a generic basketball game, or some other basketball related image.

When selecting images to respond to a request, a branch in the database 200 may be selected that is associated with the information that is responsive to, most relevant, or otherwise may be associated with, the request. In these and other embodiments, each of the branches of the database 200 may be associated with a different topic. When selecting an image from a branch of the database 200, a lowest or highest hierarchical level 210 may first be polled. If no image is in the highest or lowest hierarchical level 210, a progression through the hierarchical levels 210 may occur until a hierarchical level 210 is found that includes an image 212.

For example, if the third hierarchical level 210c is selected first and no image is in the third hierarchical level 210c, the second hierarchical level 210b, and then the first hierarchical level 210a may be polled for an image.

Modifications, additions, or omissions may be made to the database 200 without departing from the scope of the present disclosure. For example, the database 200 may include one or more additional database branches and one or more additional hierarchical levels 210 in each of the database branches. Alternately or additionally, each of the hierarchical levels 210 may include additional images 212 and corresponding metadata 214. Alternately or additionally, each of the hierarchical levels 210 may include additional categories in each level that each include images 212 and metadata 214. Thus, the first hierarchical level 210a may include a general category, the second hierarchical level 210b may include multiple sub-categories of the general categories, and the third hierarchical level 210c may include multiple categories for each of the sub-categories.

Figure 3:
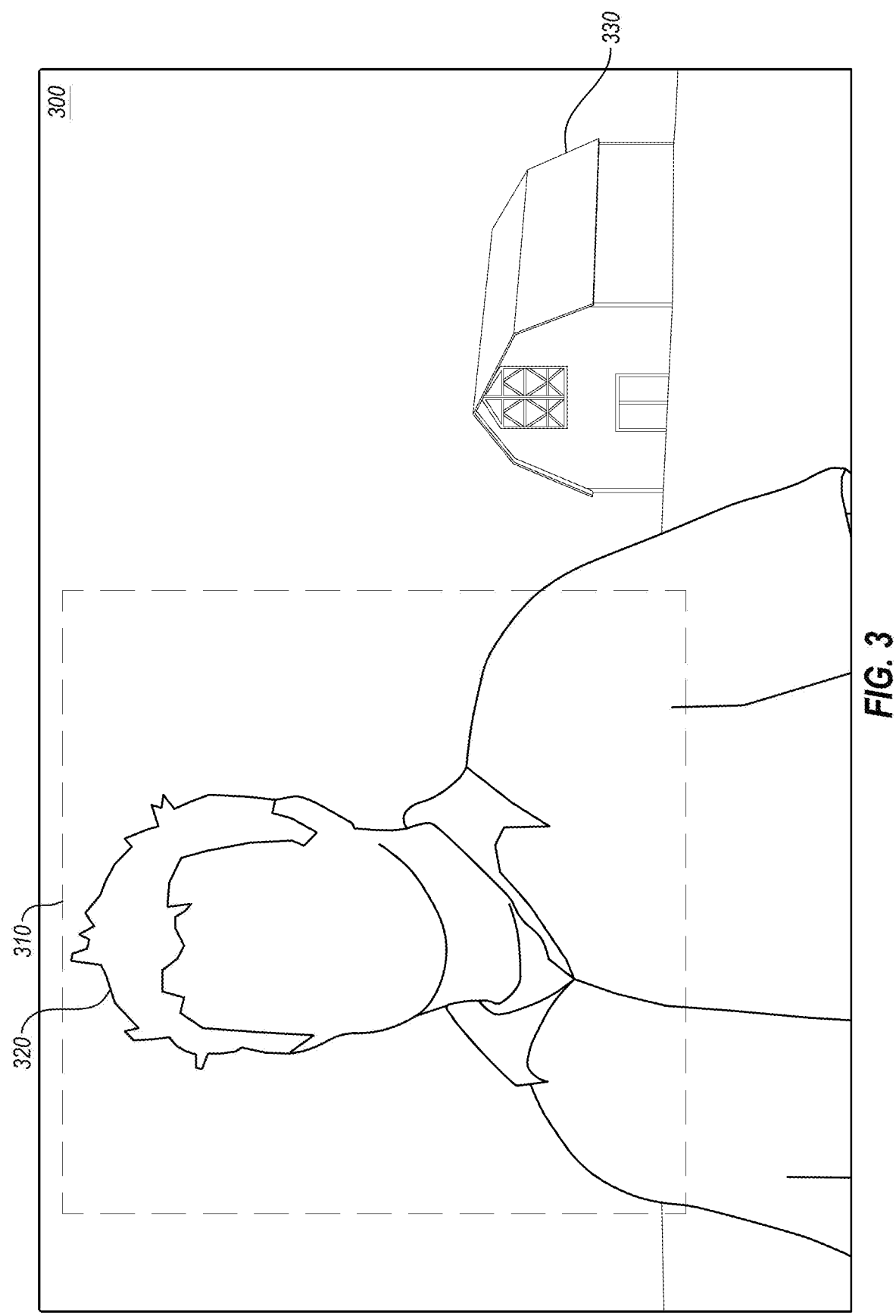
FIG. 3 illustrates an example of region of interest of a digital image.

FIG. 3 illustrates an example region of interest of a digital image 300. The digital image 300 may be arranged in accordance with at least one embodiment described in the present disclosure. The digital image 300 may be an example of a digital image that may be stored in a database in an image presentation system, such as the image presentation system 120 of FIG. 1.

The digital image 300 may include a person 320 and an object 330. In some embodiments, the digital image 300 may be processed using digital image processing techniques to determine a region of interest of the digital image 300. In these and other embodiments, the digital image processing techniques applied to the digital image 300 may be based on the classification of the digital image 300. For example, the digital image 300 may be in a hierarchical level of a database associated with images of people. Thus, the digital image processing techniques may include facial recognition algorithms.

The digital image processing techniques may be applied to the digital image 300, including the facial recognition algorithms, to determine a location of a face of the person 320 in the digital image 300. For example, the facial recognition algorithms may distinguish the face of the person 320 from the object 330. After determining the location of the face, processing techniques may be applied to determine an outline of the person 320. For example, processing techniques that determine boundary lines in digital images may be applied. For example, the boundary lines may be determined based on color values in the image.

After determining the boundary lines of the person 320, a region of interest 310 that includes a portion of the person 320 may be determined. As illustrated, the region of interest may be a rectangle that is positioned to include the face of the person 320. Alternately or additionally, the region of interest 310 may follow the boundary lines of the person 320. Alternately or additionally, the region of interest 310 may be another shape, such as a square, oval, circle, or other shape that is sized to include the face of the person 320.

In some embodiments, the region of interest 310 may touch the boundary of the person 320. Alternately or additionally, the region of interest 310 may extend away from the boundary of the person 320 a set amount or a flexible amount to create a parameter around the boundary of the person 320.

In some embodiments, region data may be generated to describe the region of interest. In some embodiments, the region data may include locations of one or more points of the region of interest on the digital image 300 and information about the dimensions of the region of interest. Alternately or additionally, the region data may include multiple points along an outline of the region of interest, such that the region of interest may be determined based on the points.

Modifications, additions, or omissions may be made to digital image 300 without departing from the scope of the present disclosure. For example, the digital image 300 may include multiple people. In these and other embodiments, the region of interest may be determined that includes all of the people. In some embodiments, the region of interest may be a stage, a venue, a monument, or some other object. In these and other embodiments, digital image processing techniques other than facial recognition may be used to determine the one or more objects in the digital image 300 that may be used to define the region of interest 310 for the digital image 300.

Figure 4:
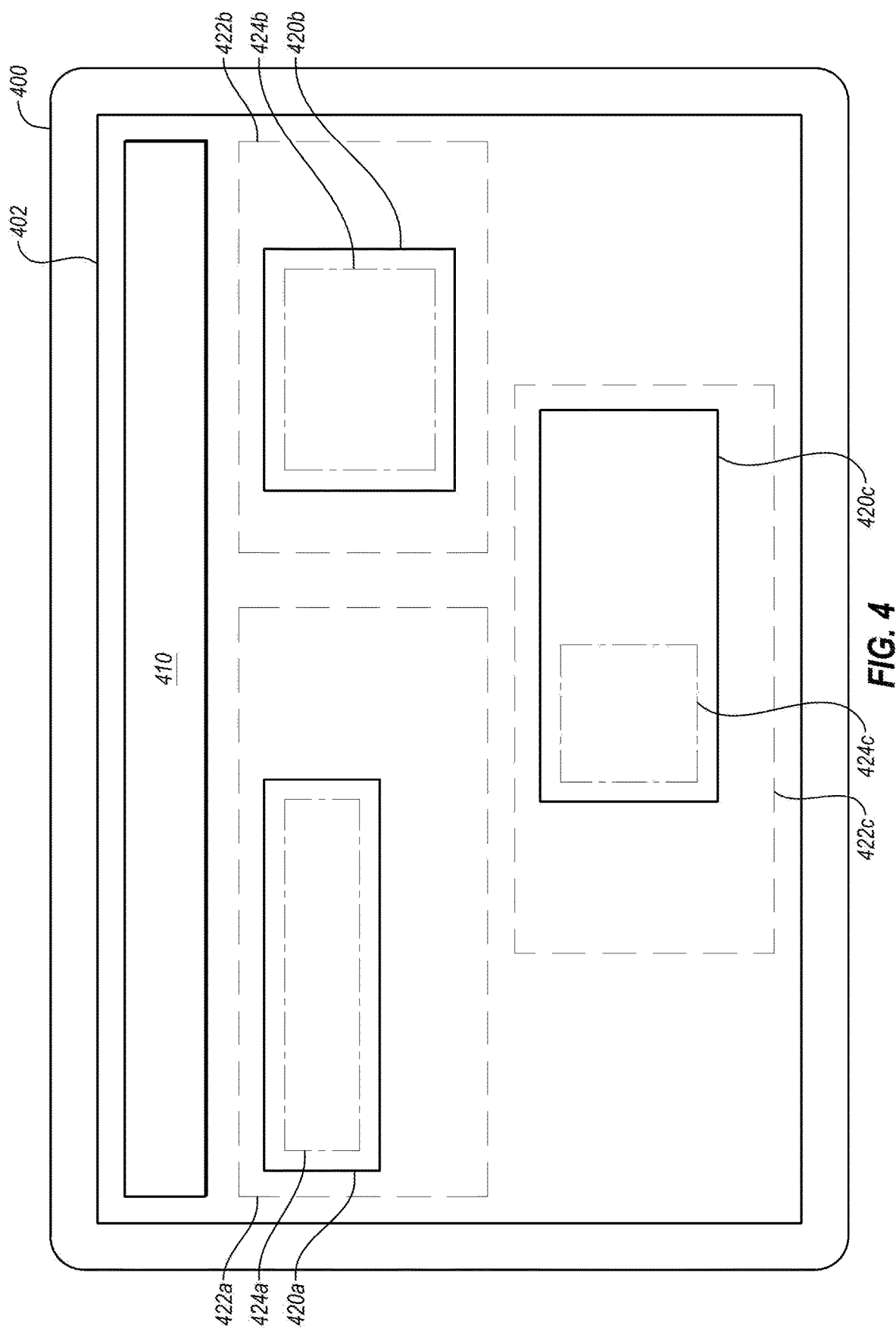
FIG. 4 illustrates an example device with a display that presents digital images.

FIG. 4 illustrates an example device 400 with a display 402 that presents digital images. The device 400 may be arranged in accordance with at least one embodiment described in the present disclosure. For example, the device 400 may be an example of the user device 140 of FIG. 1.

The display 402 may present a text region 410, a first image display area 420a, a second image display area 420b, and a third image display area 420c, collectively the image display areas 420. The first image display area 420a may be configured to display a portion of a first digital image 422a with a first region of interest 424a. The second image display area 420b may be configured to display a portion of a second digital image 422b with a second region of interest 424b. The third image display area 420c may be configured to display a portion of a third digital image 422c with a third region of interest 424c.

The first digital image 422a, the second digital image 422b, and the third digital image 422c may be referred to collectively as the digital images 422 and the first region of interest 424a, the second region of interest 424b, and the third region of interest 424*c* may be referred to collectively as the regions of interest 424.

As illustrated, each of the first image display area 420*a*, the second image display area 420*b*, and the third image display area 420*c* may have different sizes and/or shapes. Furthermore, each of the first digital image 422*a*, the second digital image 422*b*, and the third digital image 422*c*, may have different sizes and the region of interests 424 for each of the digital images 422 may be different. In some embodiments, the cropping view of the digital images 422 may correspond to the image display areas 420.

In some embodiments, the image display areas 420 may have different configurations and/or locations within the display 402 based on a configuration of the device 400. In some embodiments, an application, such as a browser or other specific application, running on the device 400 may determine the sizes of the image display areas 420. Based on the sizes of the image display areas 420, the application may determine a cropping view of the digital images 422 such that the regions of interest 424 of the digital images 422 are at least partially displayed in the image display areas 420.

In some embodiments, the regions of interest 424 may be smaller than the image display areas 420. For example, the first region of interest 424*a* and the third region of interest 424*c* may be smaller than the first display area 420*a* and the third display area 420*c*, respectively. In these and other embodiments, the cropping view of the first digital image 422*a* may be larger than the first region of interest 424*a* and the cropping view of the third digital image 422*c* may be larger than the third region of interest 424*c*.

In these and other embodiments, the application may center or offset the regions of interest 424 within the image display areas 420. For example, the first region of interest 424*a* may be centered in the first image display area 420*a* and the third region of interest 424*c* may be offset in the third image display area 420*c*.

In some embodiments, the regions of interest 424 may be larger than the image display areas 420. For example, the second region of interest 424*b* may be larger than the second image display area 420*b*. Thus, the cropping view of the second digital image 422*b* may be smaller than the second region of interest 424*b*. In these and other embodiments, the cropping view may be configured to display as much of the second region of interest 424*b* in the second image display area 420*b* as possible.

In some embodiments, the application on the device 400 may be configured to determine the image display areas 420 based on the regions of interest 424. In these and other embodiments, the cropping view of the digital images 422 may be the same as the regions of interest 424 and the image display areas 420.

Modifications, additions, or omissions may be made to the device 400 without departing from the scope of the present disclosure. For example, each of the image display areas 420 may be associated with a text region. Alternately or additionally, there may be more or less image display areas 420 and/or the image display areas 420 may be presented in different areas or configurations. As another example, an image may include multiple regions of interest. In these and other embodiments, the cropping view of the image may be selected such that one or more of the multiple regions of interest may be displayed in a display area.

Figure 5:
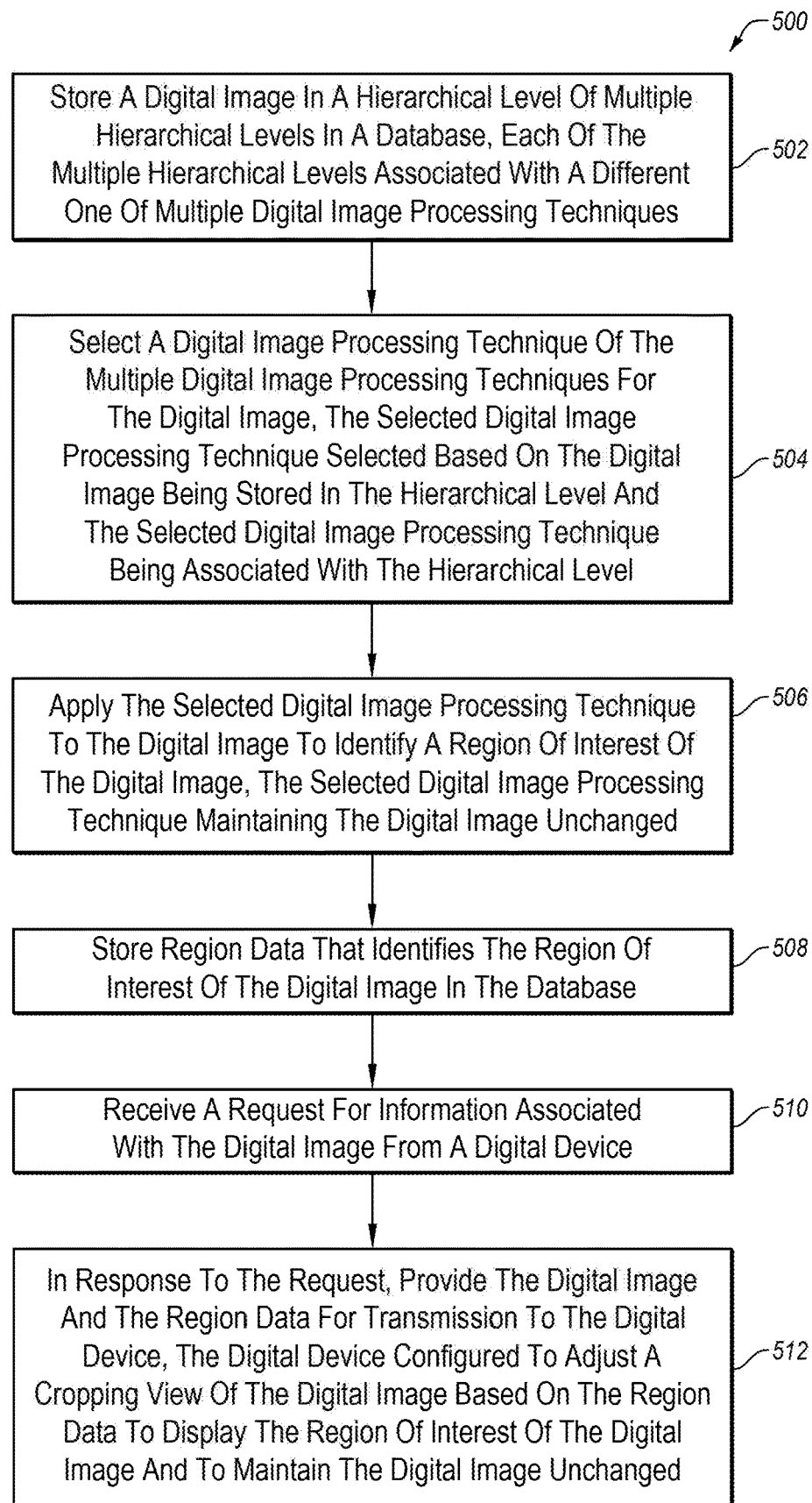
FIG. 5 is a flowchart of example operations to present digital images.

FIG. 5 is a flowchart of example operations 500 to present digital images. The operations 500 may be arranged in accordance with at least one embodiment described in the present disclosure. The operations 500 may be performed, in some embodiments, by a system, such as the system 100 and/or 700 of FIGS. 1 and 7, respectively. In these and other embodiments, the operations 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The operations 500 may begin at block 502, where a digital image may be stored in a hierarchical level of multiple hierarchical levels in a database. Each of the multiple hierarchical levels may be associated with a different one of multiple digital image processing techniques.

In block 504, a digital image processing technique of the multiple digital image processing techniques may be selected for the digital image. The selected digital image processing technique may be selected based on the digital image being stored in the hierarchical level and the selected digital image processing technique being associated with the hierarchical level. In some embodiments, the selected digital image processing technique may include facial recognition processing.

In block 506, the selected digital image processing technique may be applied to the digital image to identify a region of interest of the digital image. The selected digital image processing technique may maintain the digital image unchanged.

In block 508, store region data that identifies the region of interest of the digital image in the database. In some embodiments, the region data may include one or more coordinates on the digital image that corresponds to the region of interest of the digital image. In block 510, a request for information associated with the digital image may be received from a digital device.

In block 512, in response to the request, the digital image and the region data may be provided for transmission to the digital device. The digital device may be configured to adjust a cropping view of the digital image based on the region data to display the region of interest of the digital image and to maintain the digital image unchanged.

In some embodiments, in response to the request, presentation code may be provided with the digital image and the region data. The presentation code may be configured to cause a web browser of the digital device to adjust a cropping view of the digital image based on the region data and information provided by the web browser about the digital device.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 6:
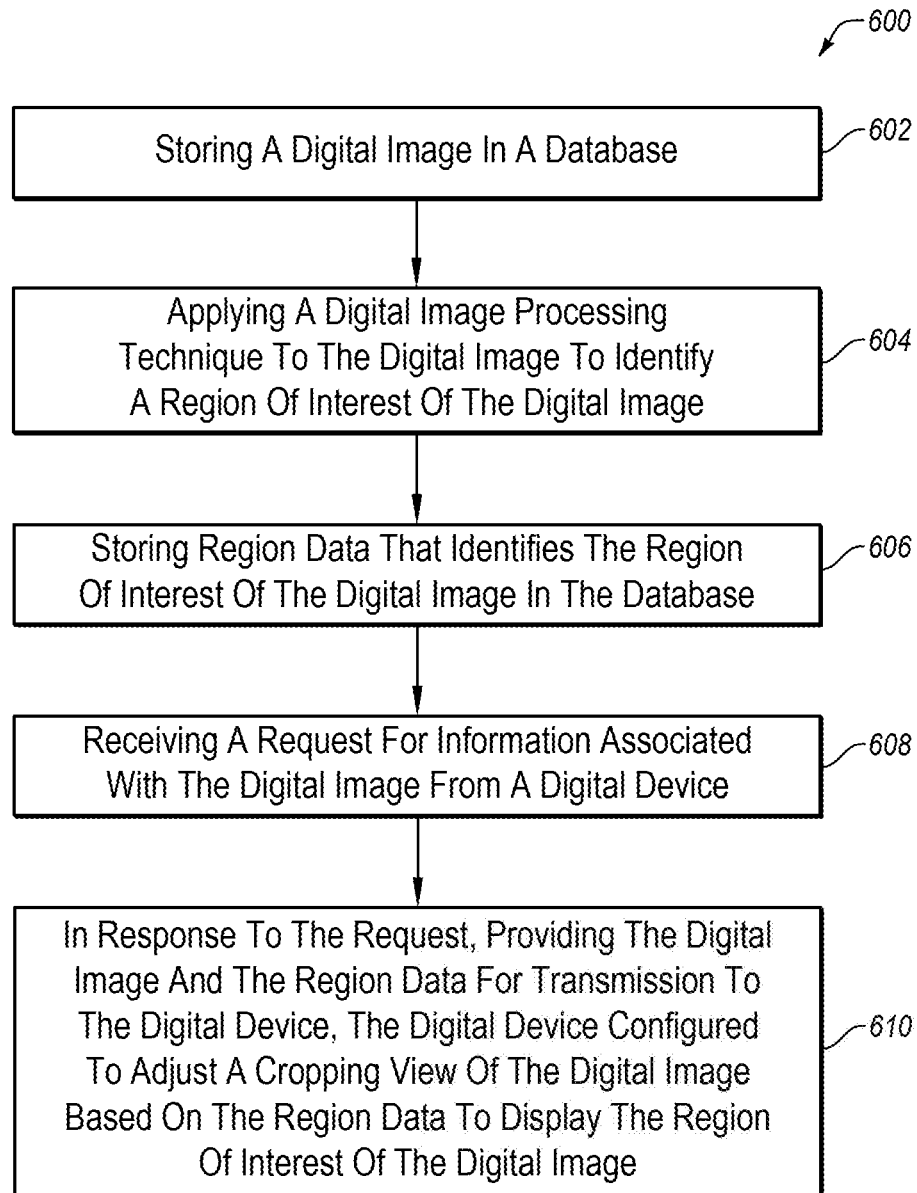
FIG. 6 is a flowchart of an example computer-implemented method to present digital images.

FIG. 6 is a flowchart of an example computer-implemented method 600 to present digital images. The method 600 may be arranged in accordance with at least one embodiment described in the present disclosure. The method 600 may be implemented, in some embodiments, by a system, such as the system 100 and/or 700 of FIGS. 1 and 7, respectively. Although illustrated as discrete blocks, various blocks may be divided into additional blocks, combined into fewer blocks, or eliminated, depending on the desired implementation.

The method 600 may begin at block 602, where a digital image may be stored in a database. In some embodiments, the digital image may be stored in a hierarchical level of multiple hierarchical levels in the database. In these and other embodiments, each of the plurality of hierarchical levels may be associated with a different one of multiple digital image processing techniques.

In block 604, a digital image processing technique may be applied to the digital image to identify a region of interest of the digital image. In some embodiments, the digital image processing technique may maintain the digital image unchanged. In some embodiments, the digital image processing technique may include facial recognition processing.

In block 606, region data that identifies the region of interest of the digital image may be stored in the database. In some embodiments, the region data may include one or more coordinates on the digital image that corresponds to the region of interest of the digital image.

In block 608, a request for information associated with the digital image may be received from a digital device. In block 610, in response to the request, the digital image and the region data may be provided for transmission to the digital device. The digital device may be configured to adjust a cropping view of the digital image based on the region data to display the region of interest of the digital image.

In some embodiments, in response to the request, presentation code may be provided with the digital image and the region data. The presentation code may be configured to cause a web browser of the digital device to adjust a cropping view of the digital image based on the region data and information provided by the web browser about the digital device. In some embodiments, the presentation code may be further configured to direct the web browser to maintain the digital image unchanged.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 600 may further include selecting the digital image processing technique of the plurality of digital image processing techniques for the digital image. The digital image processing technique selected may be based on the digital image being stored in a hierarchical level and the digital image processing technique being associated with the hierarchical level.

Figure 7:
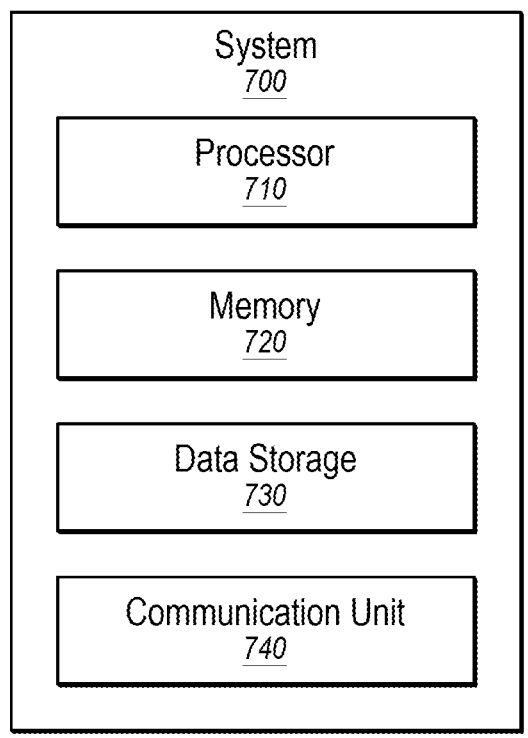
FIG. 7 is an example system for digital images presentation.

FIG. 7 illustrates an example system 700, according to at least one embodiment described herein. The system 700 may include any suitable system, apparatus, or device configured to test software. The system 700 may include a processor 710, a memory 720, a data storage 730, and a communication device 740, which all may be communicatively coupled.

Generally, the processor 710 may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 7, it is understood that the processor 710 may include any number of processors distributed across any number of network or physical locations that are configured to perform individually or collectively any number of operations described herein. In some embodiments, the processor 710 may interpret and/or execute program instructions and/or process data stored in the memory 720, the data storage 730, or the memory 720 and the data storage 730. In some embodiments, the processor 710 may fetch program instructions from the data storage 730 and load the program instructions into the memory 720.

After the program instructions are loaded into the memory 720, the processor 710 may execute the program instructions. For example, the system 700 may be part of the image presentation system 120 of FIG. 1. In these and other embodiments, the instructions may include the processor 710 performing the digital image processing techniques on digital images to determine the region of interest of the digital images. Alternately or additionally, the processor 710 may be instructed to respond to a request from a device. In these and other embodiments, the digital images and the region data may be stored in the data storage 730. The processor 710 may fetch the digital image and region data from the data storage 730 and may provide the digital image and region data to the communication device 740 for transmission to the requesting device.

As another example, the system 700 may be part of the user device 140 or device 400 of FIGS. 1 and 4. In these and other embodiments, the processor 710 may perform operations such as receive a digital image and region data and adjust a cropping view of the digital image based on the region data to display a region of interest of the digital image.

The memory 720 and the data storage 730 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 710.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 710 to perform a certain operation or group of operations.

The communication device 740 may include any component, device, system, or combination thereof that is configured to transmit or receive information over a network. In some embodiments, the communication device 740 may communicate with other devices at other locations, the same location, or even other components within the same system. For example, the communication device 740 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. The communication device 740 may permit data to be exchanged with a network and/or any other devices or systems described in the present disclosure. For example, if the system 700 is included in the image presentation system 120 of FIG. 1, the communication device 740 may allow the image presentation system 120 to communicate with the image storage system 130 and the user device 140 over the network 110 of FIG. 1.

Modifications, additions, or omissions may be made to the system 700 without departing from the scope of the present disclosure. For example, the data storage 730 may be multiple different storage mediums located in multiple locations and accessed by the processor 710 through a network.

As indicated above, the embodiments described herein may include the use of a special purpose or general purpose computer (e.g., the processor 710 of FIG. 7) including various computer hardware or software modules, as discussed in greater detail below. Further, as indicated above, embodiments described herein may be implemented using computer-readable media (e.g., the memory 720 or data storage 730 of FIG. 7) for carrying or having computer-executable instructions or data structures stored thereon.

In some embodiments, the different components, modules, engines, and services described herein may be implemented as objects or processes that execute on a computing system (e.g., as separate threads). While some of the system and methods described herein are generally described as being implemented in software (stored on and/or executed by general purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific that the terms "first," "second," "third," etc., connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A system, comprising:
one or more processors; and
a memory device storing instructions which, when executed by the one or more processors, cause the system to perform operations comprising:
determining, by the one or more processors applying a first image processing technique to a first image classified in a category, first region data identifying a first region of interest for generating a first cropping view from the first image;
determining, by the one or more processors applying a second image processing technique to a second image classified in a sub-category of the category, second region data identifying a second region of interest for generating a second cropping view from the second image;
receiving, from a user device, a request for information associated with the category; and
transmitting, in response to the request, one or both of the first image or the second image and at least one of the first region data that identifies the first region of interest for generating the first cropping view or the second region data that identifies the second region of interest for generating the second cropping view.

2. The system of claim 1, wherein the instructions, when executed by the one or more processors, cause the system to perform operations comprising:
   determining that a nested sub-category of the sub-category lacks a third image, wherein transmitting one or both of the first image or the second image and at least one of the first region data or the second region data is based at least in part on the nested sub-category of the sub-category lacking a third image.

3. The system of claim 1, wherein the instructions, when executed by the one or more processors, cause the system to perform operations comprising:
   transmitting, in response to the request, instructions indicating to adjust one or more views of the first image, the second image, or both based at least in part on the first region data, the second region data, or both.

4. The system of claim 1, wherein the instructions, when executed by the one or more processors, cause the system to perform operations comprising:
   determining, by the one or more processors applying a third image processing technique to a third image classified in the category, third region data identifying a third region of interest for generating a third cropping view from the third image; and
   transmitting, in response to the request, the third image and the third region data that identifies the third region of interest for generating the third cropping view.

5. The system of claim 1, wherein the first region data include one or more first coordinates on the first image that correspond to the first region of interest, the second region data include one or more second coordinates on the second image that correspond to the second region of interest, or both.

6. The system of claim 1, wherein the first image processing technique, the second image processing technique, or both, are associated with the category, the sub-category, or both, based at least in part on content of images classified in the category, the sub-category, or both.

7. The system of claim 1, wherein the first image processing technique, the second image processing technique, or both, include facial recognition processing, skin tone processing, background detection processing, or any combination thereof.

8. The system of claim 1, wherein the first region data, the second region data, or both are associated with a device orientation, a device display size, a device display area, a device resolution, or any combination thereof.

9. A method, comprising:
   determining, by one or more processors applying a first image processing technique to a first image classified in a category, first region data identifying a first region of interest for generating a first cropping view from the first image;
   determining, by the one or more processors applying a second image processing technique to a second image classified in a sub-category of the category, second region data identifying a second region of interest for generating a second cropping view from the second image;
   receiving, from a user device, a request for information associated with the category; and
   transmitting, in response to the request, one or both of the first image or the second image and at least one of the first region data that identifies the first region of interest for generating the first cropping view or the second region data that identifies the second region of interest for generating the second cropping view.

10. The method of claim 9, further comprising:
    determining that a nested sub-category of the sub-category lacks a third image, wherein transmitting one or both of the first image or the second image and at least one of the first region data or the second region data is based at least in part on the nested sub-category of the sub-category lacking a third image.

11. The method of claim 9, further comprising:
    transmitting, in response to the request, instructions indicating to adjust one or more views of the first image, the second image, or both based at least in part on the first region data, the second region data, or both.

12. The method of claim 9, further comprising:
    determining, by the one or more processors applying a third image processing technique to a third image classified in the category, third region data identifying a third region of interest for generating a third cropping view from the third image; and
    transmitting, in response to the request, the third image and the third region data that identifies the third region of interest for generating the third cropping view.

13. The method of claim 9, wherein the first region data include one or more first coordinates on the first image that correspond to the first region of interest, the second region data include one or more second coordinates on the second image that correspond to the second region of interest, or both.

14. The method of claim 9, wherein the first image processing technique, the second image processing technique, or both, are associated with the category, the sub-category, or both, based at least in part on content of images classified in the category, the sub-category, or both.

15. The method of claim 9, wherein the first image processing technique, the second image processing technique, or both, include facial recognition processing, skin tone processing, background detection processing, or any combination thereof.

16. The method of claim 9, wherein the first region data, the second region data, or both are associated with a device orientation, a device display size, a device display area, a device resolution, or any combination thereof.

17. A non-transitory computer-readable medium storing instructions that, when executed by one or more hardware processors, cause the one or more hardware processors to perform operations comprising:
    determining, by the one or more hardware processors applying a first image processing technique to a first image classified in a category, first region data identifying a first region of interest for generating a first cropping view from the first image;
    determining, by the one or more hardware processors applying a second image processing technique to a second image classified in a sub-category of the category, second region data identifying a second region of interest for generating a second cropping view from the second image;
    receiving, from a user device, a request for information associated with the category; and
    transmitting, in response to the request, one or both of the first image or the second image and at least one of the first region data that identifies the first region of interest for generating the first cropping view or the second region data that identifies the second region of interest for generating the second cropping view.

18. The non-transitory computer-readable medium of claim 17, wherein the operations further comprise:

determining that a nested sub-category of the sub-category lacks a third image, wherein transmitting one or both of the first image or the second image and at least one of the first region data or the second region data is based at least in part on the nested sub-category of the sub-category lacking a third image.

19. The non-transitory computer-readable medium of claim 17, wherein the operations further comprise:
transmitting, in response to the request, instructions indicating to adjust one or more views of the first image, the second image, or both based at least in part on the first region data, the second region data, or both.

20. The non-transitory computer-readable medium of claim 17, wherein the operations further comprise:
determining, by the one or more hardware processors applying a third image processing technique to a third image classified in the category, third region data identifying a third region of interest for generating a third cropping view from the third image; and
transmitting, in response to the request, the third image and the third region data that identifies the third region of interest for generating the third cropping view.

* * * * *